(12) United States Patent
Xu

(10) Patent No.: US 9,982,544 B2
(45) Date of Patent: May 29, 2018

(54) COOLING HAVING TAILORED FLOW RESISTANCE

(71) Applicant: United Technologies Corporation, Hartford, CT (US)

(72) Inventor: Jinquan Xu, East Greenwich, RI (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 284 days.

(21) Appl. No.: 14/852,956

(22) Filed: Sep. 14, 2015

(65) Prior Publication Data

US 2016/0194967 A1 Jul. 7, 2016

Related U.S. Application Data

(63) Continuation of application No. 62/078,608, filed on Nov. 12, 2014.

(51) Int. Cl.
| | | |
|---|---|---|
| *F01D 5/18* | (2006.01) | |
| *F02C 7/12* | (2006.01) | |
| *F02C 7/28* | (2006.01) | |

(52) U.S. Cl.
CPC ............. *F01D 5/189* (2013.01); *F01D 5/188* (2013.01); *F02C 7/12* (2013.01); *F02C 7/28* (2013.01); *F05D 2220/32* (2013.01); *F05D 2260/20* (2013.01)

(58) Field of Classification Search
None
See application file for complete search history.

(56) References Cited

U.S. PATENT DOCUMENTS 6,402,470 B1 * 6/2002 Kvasnak ............... F01D 5/187
415/115
2013/0276461 A1 10/2013 Ropheter-Hinckley

FOREIGN PATENT DOCUMENTS

| EP | 2011970 | 1/2009 | |
|---|---|---|---|
| WO | 2014105108 | 7/2014 | |
| WO | WO 2014105108 A1 * | 7/2014 | ............. F01D 5/187 |

OTHER PUBLICATIONS

EP Search Report dated Mar. 22, 2016 in EP App No. 15192779.5.

* cited by examiner

*Primary Examiner* — Logan Kraft
*Assistant Examiner* — Jason Davis
(74) *Attorney, Agent, or Firm* — Snell & Wilmer L.L.P.

(57) ABSTRACT

The present disclosure includes gas turbine engine components which are cooled internally through the inclusion of lattice structures. Such structures may comprise a network of branches and nodes. Further, the branches may vary in size, shape, and configuration.

17 Claims, 5 Drawing Sheets

COOLING HAVING TAILORED FLOW RESISTANCE

CROSS-REFERENCE TO RELATED APPLICATIONS

This application is a nonprovisional of, and claims priority to, and the benefit of U.S. Provisional Application No. 62/078,608, entitled "COOLING HAVING TAILORED FLOW RESISTANCE," filed on Nov. 12, 2014, which is hereby incorporated by reference in its entirety.

FIELD

The present disclosure relates generally to components of gas turbine engines and, more specifically, to components of gas turbine engines cooled by lattice structures having branches and/or nodes of varied configurations.

BACKGROUND

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Due to exposure to hot combustion gases, numerous components of a gas turbine engine may include cooling schemes that circulate airflow to cool the component during engine operation. Thermal energy is transferred from the component to the airflow as the airflow circulates through the cooling scheme to cool the component. Known cooling schemes may be inefficient and lack structural integrity.

SUMMARY

A component in accordance with the present disclosure may comprise a wall and a lattice structure formed inside of the wall and configured to communicate a cooling fluid therethrough, the lattice structure including a plurality of nodes and a plurality of branches connected to the plurality of the nodes, wherein at least one of the branches includes at least one of a non-uniform surface, a bend, or a non-circular cross section. The component may comprise an airfoil, a blade, a stator vane, a blade outer air seal, a combustor panel, or an augmentor panel. One of the branches may have a taper along a length thereof, and/or an oval, a square, or a rectangular cross section. One of the branches may include an inner surface having a non-uniform surface profile and/or an outer surface having a non-uniform surface profile.

A gas turbine engine in accordance with the present disclosure may comprise a component comprising one of an airfoil, a blade, a stator vane, a blade outer air seal, or a combustor panel having a wall, and a lattice structure inside the component comprising a plurality of nodes and a plurality of branches connected to the plurality of nodes, wherein at least one of the branches includes at least one of a non-uniform surface profile, a bend, or a non-circular cross section. One of the branches may have a taper along a length thereof, and/or an oval, a square, or a rectangular cross section. One of the branches may include an inner surface having a non-uniform surface profile and/or an outer surface having a non-uniform surface profile.

A method may comprise the steps of evaluating the cooling need of a portion of a component and forming a lattice structure to meet the cooling need of the portion of the component, wherein the lattice structure comprises a plurality of nodes and a plurality of branches having at least one of a non-uniform surface, a bend, or a non-circular cross section. The lattice structure may be formed using an additive manufacturing process. The lattice structure may be a solid vascular structure. Further, the branch may comprise a along a length thereof.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
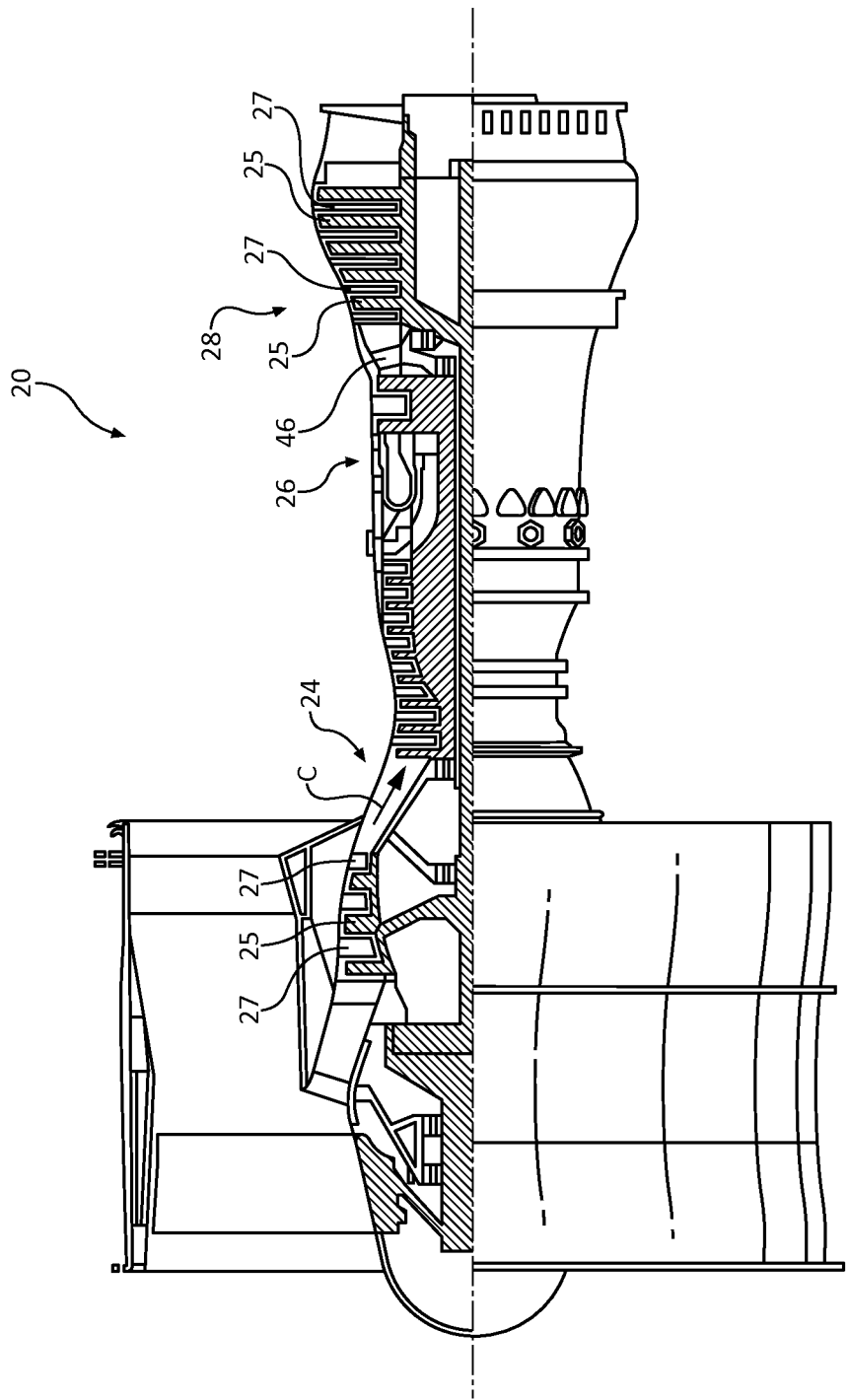
FIG. 1 illustrates, in accordance with the present disclosure, a side view of a gas turbine engine.

Accordingly, with reference to FIG. 1, a gas turbine engine 20 is shown. In general terms, gas turbine engine may comprise a compressor section 24. Air may flow through compressor section 24 and into a combustion section 26, where it is mixed with a fuel source and ignited to produce hot combustion gasses. These hot combustion gasses may drive a series of turbine blades within a turbine section 28, which in turn drive, for example, one or more compressor section blades mechanically coupled thereto.

Each of compressor section 24 and turbine section 28 may include alternating rows of rotor assemblies and vane assemblies (shown schematically) that carry airfoils that extend into core flow path C. For example, the rotor assemblies may carry a plurality of rotating blades 25, while each vane assembly may carry a plurality of vanes 27 that extend into core flow path C. Blades 25 create or extract energy (in the form of pressure) from the core airflow that is communicated through gas turbine engine 20 along core flow path C. Vanes 27 direct the core airflow to blades 25 to either add or extract energy.

Various components of gas turbine engine 20, including but not limited to airfoils of blades 25 and vanes 27 of compressor section 24 and turbine section 28, may be subjected to repetitive thermal cycling under widely ranging temperatures and pressures. The hardware of turbine section 28 is particularly subjected to relatively extreme operating conditions. Therefore, some components may require internal cooling schemes for cooling the parts during engine operation.

Among other features, this disclosure relates to gas turbine engine component cooling schemes that include lattice structures inside the walls of the gas turbine engine component. The exemplary structures described herein provide effective localized convective cooling for gas turbine engine components that may be subject to the hot combustion gases that are communicated through the core flow path C.

Figure 2:
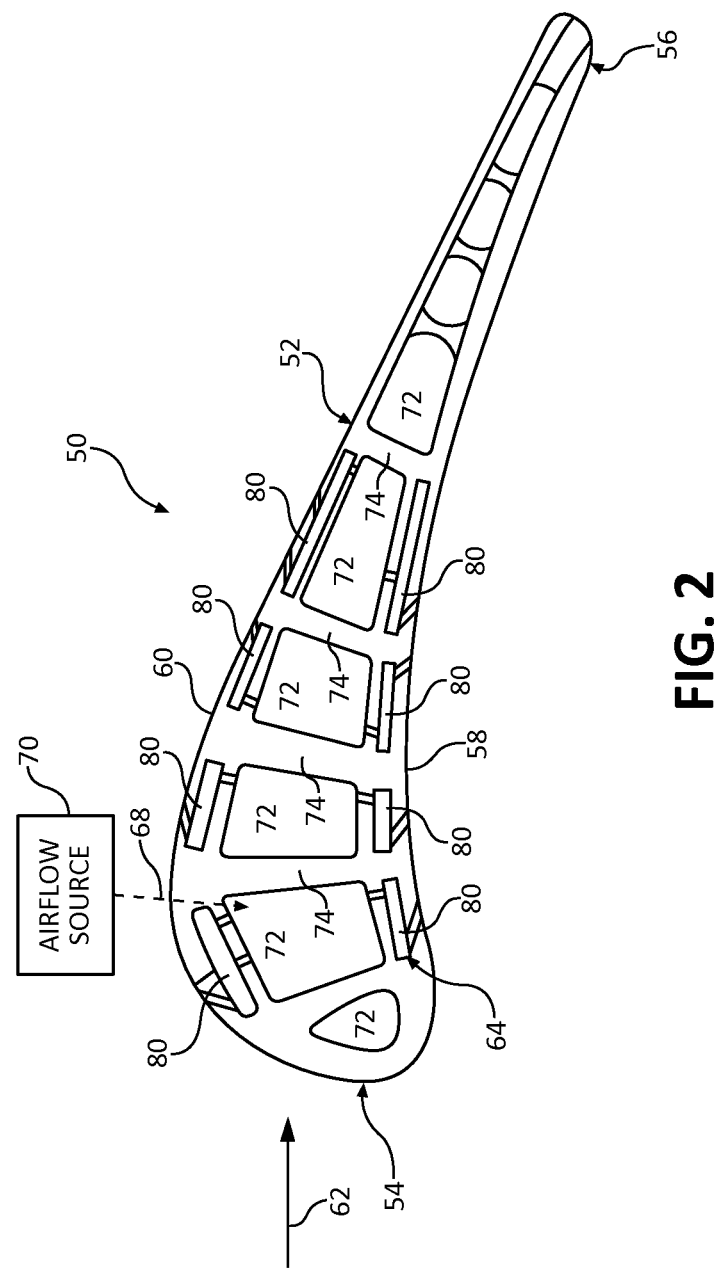
FIG. 2 illustrates, in accordance with the present disclosure, a component of a gas turbine engine.

FIG. 2 illustrates a component 50 that may be incorporated into a gas turbine engine, such as gas turbine engine 20 of FIG. 1. In various embodiments, component 50 is an airfoil. For example, airfoil 50 may include a body portion 52 that extends between a leading edge portion 54 and a trailing edge portion 56. Body portion 52 may further include a first (pressure) side wall 58 and a second (suction) side wall 60 that are spaced apart from one another and axially extend between leading edge portion 54 and trailing edge portion 56. Although shown in cross-section, body portion 52 would also extend radially within gas turbine engine 20.

A gas path 62 is communicated axially downstream through gas turbine engine 20 in a direction that extends from leading edge portion 54 toward trailing edge portion 56 of body portion 52. Gas path 62 represents the communication of core airflow along the core flow path C (see FIG. 1).

In various embodiments, an airflow 68 can be circulated through a cooling scheme 64 within body portion 52. Airflow 68 may comprise a bleed airflow that sourced from gas path 62 or an air source provided from the compressor section 24 or any other portion of gas turbine engine 20. In various embodiments, airflow 68 is communicated to cooling scheme 64 through a root portion of airfoil 50 (e.g., where the airfoil is a blade). Airflow 68 is generally of a lower temperature than the airflow of gas path 62 that is communicated across body portion 52. Airflow 68 may be circulated through cooling scheme 64 to transfer thermal energy from airfoil 50 to airflow 68 thereby cooling airfoil 50.

Cooling scheme 64 may be disposed inside body portion 52 for cooling the internal and external surface areas of airfoil 50. For example, cooling scheme 64 may include one or more cavities 72 that may extend inside of body portion 52 to establish cooling passages for receiving airflow 68 (or some other fluid). However, cooling scheme 64 is not necessarily limited to the configuration shown, and it will be appreciated that a greater or fewer number of cavities, including only a single cavity, may be defined inside of body portion 52. Cavities 72 communicate airflow 68 through cooling scheme 64, such as along a serpentine or linear path, to cool body portion 52.

In accordance with various embodiments, one or more lattice structures 80 may be incorporated into any section or sections of airfoil 50 as part of cooling scheme 64. In this disclosure, the term "lattice structure" denotes a structure of known surface and flow areas. For example, discrete portions of airfoil 50 may embody a lattice structure, or the entire airfoil 50 may be constructed of a lattice structure. As further discussed below, lattice structures 80 can embody a hollow configuration in which cooling airflow 68 may be circulated inside various branches (e.g., passages) thereof. Lattice structure 80 can also comprise a solid configuration in which airflow 68 is communicated over and around such branches, which may be formed hollow or solid.

Lattice structure 80 may be created using additive manufacturing processes such as direct metal laser sintering (DMLS), electron beam melting (EBM), select laser sintering (SLS), select laser melting (SLM), or the like. Casting processes and additive manufacturing process used to produce a molybdenum core (e.g., a refractory metal core) may be utilized. Such additive manufacturing processes can include a powder bed technology and such casting processes can include a leaching process.

Figure 3B:
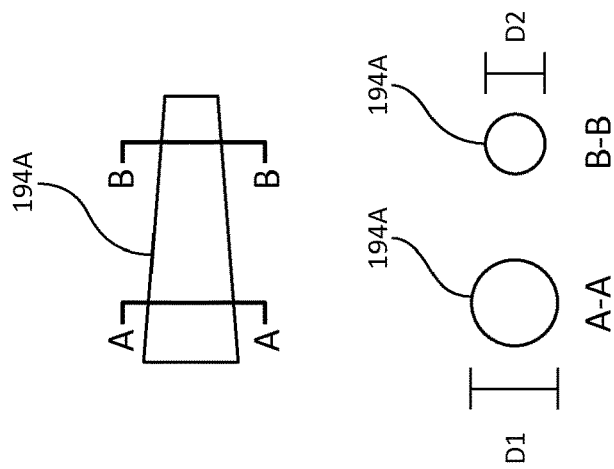
FIGS. 3A and 3B illustrate, in accordance with the present disclosure, a lattice structure of a gas turbine engine component and a cross section of a branch, respectively.
Figure 3A:
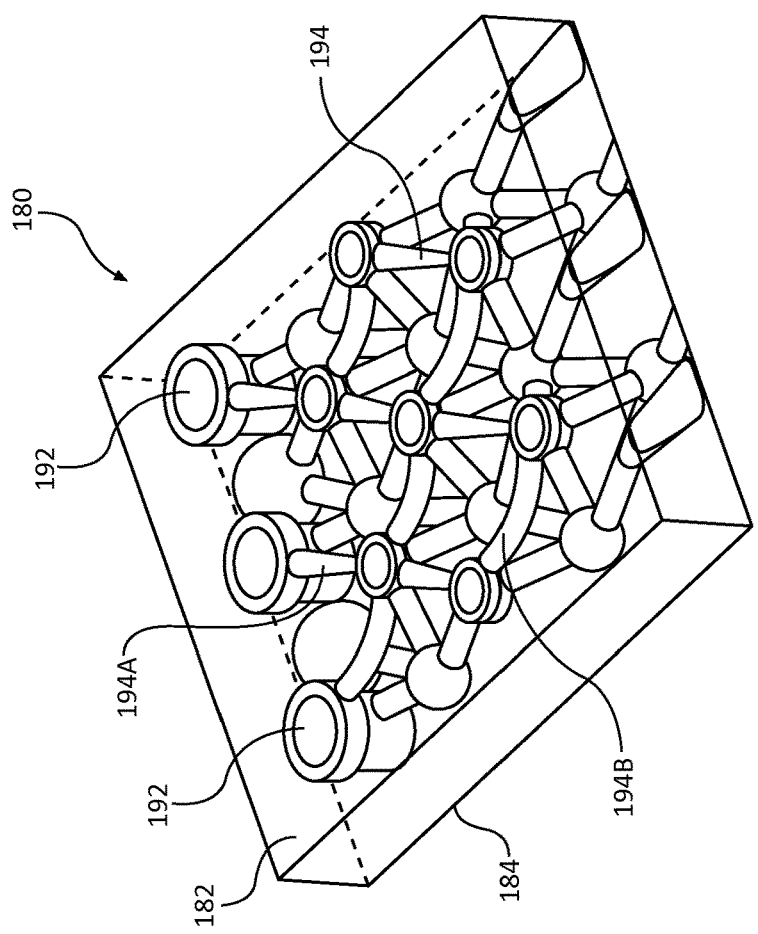

Referring to FIGS. 3A-3B with continued reference to FIG. 2, a first exemplary lattice structure 180 extends between a first wall 182 and a second wall 184 of airfoil 50. For example, first wall 182 is spaced from second wall 184. First wall 182 may be exposed to gas path 62, whereas second wall 184 may be remotely positioned from gas path 62. Airflow 68 may enter lattice structure 180 to convectively cool airfoil 50. Lattice structure 180 may comprise a plurality of nodes 192, a plurality of branches 194 that extend between the nodes 192, and a plurality of passages 196 between the branches 194 and the nodes 192. The number, size and distribution of nodes 192, branches 194, and passages 196 may vary from the specific configuration shown. Stated another way, the configuration illustrated by FIGS. 3A and 3B is but one possible design in accordance with various embodiments.

The arrangement of nodes 192 and branches 194 of lattice structure 180 may be tailored to the specific cooling and structural needs of any given airfoil. For example, nodes 192 and branches 194 may act as structural members that may be tailored to "tune" steady and unsteady airfoil vibration responses in order to resist and optimally manage steady and unsteady pressure forces, centrifugal bending and curling stresses, as well as provide for improved airfoil local and section average creep and untwist characteristics and capability. In various embodiments, particular branches 194a may comprise a tapered configuration with, for example, a diameter d1 at a first portion thereof (along section A-A) that differs from a diameter d2 at a second portion thereof (along section B-B). Such a tapered configuration may, for example, increase or decrease the convective surface area of branches 194a, as well as altering the velocity of airflow within (in hollow configurations) branches 194a.

Lattice structure 180 also includes a branch 194b with a non-linear (e.g., non-straight) configuration. For example, branch 194b may comprise a bend or concavity between two nodes 192. It will be appreciated that such a non-linear configuration provides increased convective cooling surface area along a particular direction (for example, the x or y axis) for a branch of respective diameter compared to that of a linearly configured (e.g., straight) branch of the same diameter. Further, the non-linear configuration of branch 194b may provide tuning and/or structural benefits, such as improved vibration damping. Branches having any non-linear shape or configuration, including a bent, curved, spiral, twist, or other non-linear configuration may be utilized. While nodes 192 and branches 194 are shown uniformly distributed throughout lattice structure 180, it will be appreciated that nodes 192 and branches 194 may alternatively be non-uniformly distributed.

As illustrated in FIGS. 3A and 3B, in a solid configuration, airflow 68 may be circulated through the open passages 196 to cool airfoil 50 in the space between walls 182, 184. In the solid configuration, airflow 68 is circulated through open passages 196, where it contacts and provides convective cooling to both solid nodes 192 and branches 194. In addition to providing cooling, nodes 192 and branches 194 may additionally act as structural members that resist pressure, rotation forces, vibration, and loads.

In a hollow configuration, airflow 68 may be circulated inside hollow nodes 192 and hollow branches 194 to cool airfoil 50 in the space between first wall 182 and second wall 184. Airflow 68 flows from each of the hollow branches 194 and coalesces into nodes 192, which serve as a plenum for the airflow 68 to be redistributed to the next set of hollow branches 194 and hollow nodes 192.

Figure 4B:
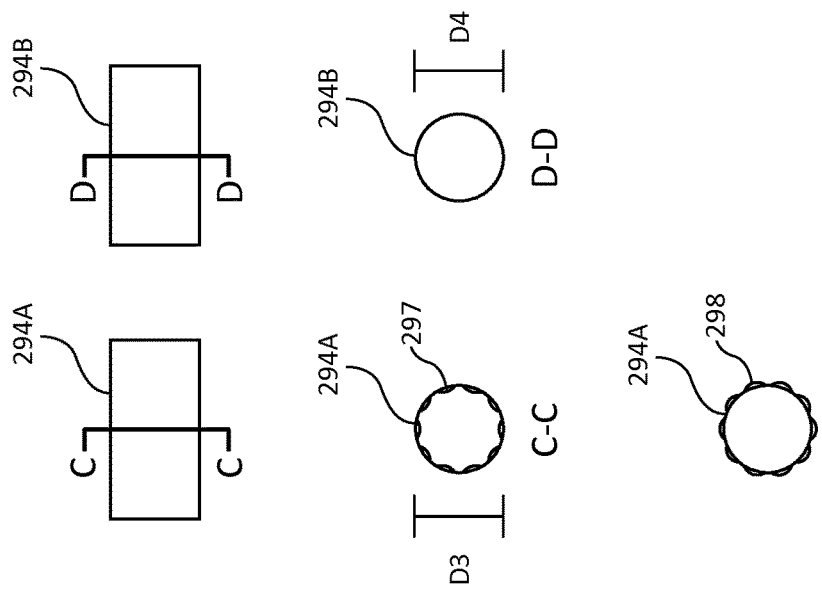
FIGS. 4A-4C illustrate, in accordance with the present disclosure, a lattice structure of a gas turbine engine component and various cross sections of branches, respectively.
Figure 4A:
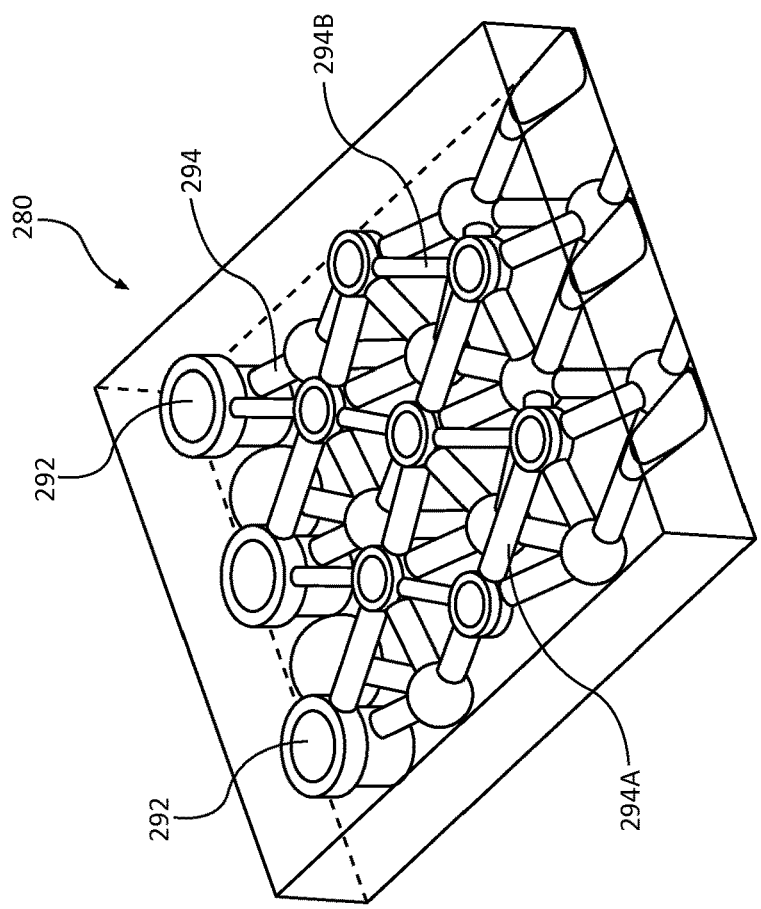

Referring to FIGS. 4A and 4B a second exemplary embodiment of a solid lattice structure 280 includes a plurality of nodes 292, a plurality of branches 294 that extend between nodes 292, and a plurality of open passages 296 between branches 294 and nodes 292. Lattice structure 280 includes branches and/or nodes with different sizes and/or shapes. For example, lattice structure 280 comprises a branch 294a with a generally cylindrical configuration having a uniform diameter d3 along the entire length thereof, and branch 284b with a generally cylindrical configuration having a diameter d4 along the entire length thereof. In various embodiments, d4 is different from d3. Any number of branches having different diameters from one other may be utilized.

In various embodiments, branch 294a may, for example, comprise a generally hollow cylindrical configuration having an inner surface with a non-uniform surface profile 297. Non-uniform surface profile 297 may increase turbulence of the air passing through the inside of branch 294a. For example, non-uniform surface profile 297 may comprise protrusions, bumps, or other textured structure configured to provide a non-uniform surface profile to the inside surface of branch 294a. Further, branch 294a may comprise an outer surface having a non-uniform surface profile 298. Similar to profile 297, non-uniform surface profile 298 may comprise protrusions, bumps, or other textured structure. Non-uniform surface profiles may increase turbulence of the air passing along the inner and/or outer surfaces of branch 294a.

Figure 4C:
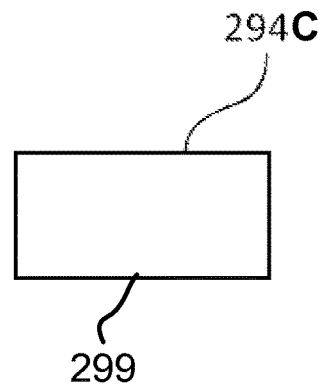
Figure 4C:
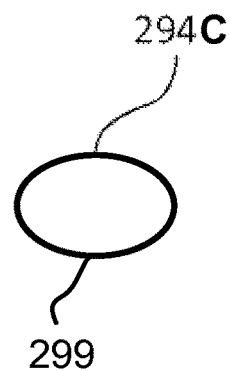

With reference to FIG. 4C, structure 280 may comprise a branch 294c having a cross section 299. In various embodiments, cross section 299 comprises a non-circular, closed curve shape such as an oval. In other embodiments, cross section 299 comprises a non-circular, polygonal shape, such as a rectangle, square, trapezoid, or any other polygon. Although described with reference to specific examples, cross section 299 may comprise any shape.

In various embodiments, solid lattice structures 80, 180, 280 establish a ratio of cooling volume to structural area. The cooling volume is determined by open passages, while the structural area is the total surface area of nodes and branches. In various embodiments, the amount of cooling volume exceeds the structural area (cooling volume>structural area). In another embodiment, a ratio of the cooling volume to the structural volume is less than 1 (cooling volume<structural area). In further embodiments, a ratio of the cooling volume to the structural area is between 1 and 4. Other configurations are also contemplated.

The specific design and configuration of the lattice structures of FIGS. 3A-3B and 4A-4C are not intended to be limiting. It will be appreciated that because these lattice structures are engineered structures, the characteristics of the components of these structures may be tailored to the specific cooling and structural needs of any given gas turbine engine component. Stated another way, lattice structures may be tailored to match external heat load, local cooling flow pressure and local life requirements by changing the design and density of the lattice structure components, such as the nodes and branches. The actual design of any given lattice structure may depend on geometry specifications, pressure loss, local cooling flow, cooling air heat pickup, thermal efficiency, overall cooling effectiveness, aerodynamic mixing, and produceability considerations, among other gas turbine engine specific parameters. In various embodiments, lattice structures are sized based on a minimum size that may be effectively manufactured and that is not susceptible to becoming plugged by dirt or other debris.

Further, although described with specific reference to an airfoil, the component of gas turbine engine 20 which incorporates the lattice structures described above may include a non-airfoil component, including but not limited to, a blade outer air seal (BOAS), a combustor, an augmentor panel, a turbine exhaust case liner, or any other part that may require dedicated cooling.

The exemplary lattice structures described in this disclosure may be incorporated into any relatively high heat load gas turbine engine applications where convective cooling is desired. Among other possible design configurations, the lattice structures of this disclosure may be implemented as a co-flow or counter-flow configurations to more efficiently provide localized convective cooling to achieve extended component operating life.

Benefits and other advantages are herein described with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine component, comprising:
    a wall; and
    a lattice structure inside the wall and configured to communicate a cooling fluid therethrough, the lattice structure including a plurality of nodes and a plurality of branches connected to the plurality of nodes, wherein a plurality of passages are defined between the plurality of branches and the plurality of nodes,
    wherein at least one branch of the plurality of branches is hollow and extends between adjoining nodes of the plurality of nodes, wherein the at least one branch extends in a curved shape between the adjoining nodes.

2. The component of claim 1, wherein the at least one branch of the plurality of branches comprises a non-uniform inside surface profile and a non-uniform outside surface profile.

3. The component of claim 1, wherein the at least one branch of the plurality of branches comprises a tapering cross-sectional dimension along a length thereof between the adjoining nodes.

4. The component of claim 1, wherein the at least one branch of the plurality of branches comprises at least one of an oval cross-section, a square cross-section, or a rectangular cross-section.

5. The component of claim 1, wherein the at least one branch of the plurality of branches comprises a first end and a second end, wherein the first end is connected to a first node of the adjoining nodes and the second end is connected to a second node of the adjoining nodes, wherein the curved shape extends along an entire length of the at least one branch from the first end to the second end.

6. The component of claim 1, wherein the component comprises an airfoil.

7. A gas turbine engine, comprising:
    a component comprising at least one of an airfoil, a blade outer air seal, a combustor or an augmentor panel having a wall; and
    a lattice structure inside the component comprising a plurality of nodes connected by a plurality of branches, wherein a plurality of passages are defined between the plurality of branches and the plurality of nodes, wherein at least one branch of the plurality of branches is hollow and extends between adjoining nodes of the plurality of nodes, wherein a cross-sectional dimension of the at least one branch tapers between the adjoining nodes.

8. The gas turbine engine of claim 7, wherein the at least one branch of the plurality of branches extends in a curved shape between the adjoining nodes.

9. The gas turbine engine of claim 8, wherein the at least one branch of the plurality of branches comprises a first end and a second end, wherein the first end is connected to a first node of the adjoining nodes and the second end is connected to a second node of the adjoining nodes, wherein the curved shape extends along an entire length of the at least one branch from the first end to the second end.

10. The gas turbine engine of claim 7, wherein the at least one branch of the plurality of branches comprises one of an oval, a square, or a rectangular cross section.

11. The gas turbine engine of claim 7, wherein the at least one branch of the plurality of branches comprises an outer surface having a non-uniform surface profile.

12. The gas turbine engine of claim 7, wherein the at least one branch of the plurality of branches comprises an inner surface having a non-uniform surface profile.

13. The gas turbine engine of claim 7, wherein the at least one branch of the plurality of branches comprises a first end and a second end, wherein the first end is connected to a first node of the adjoining nodes and the second end is connected to a second node of the adjoining nodes, wherein the cross-sectional dimension of the at least one branch continuously tapers along an entire length of the at least one branch from the first end to the second end.

14. A method, comprising:
    forming a lattice structure with a plurality of nodes and a plurality of branches, wherein a plurality of passages are defined between the plurality of branches and the plurality of nodes, wherein at least one branch of the plurality of branches is hollow and extends between adjoining nodes of the plurality of nodes, wherein a cross-sectional dimension of the at least one branch tapers between the adjoining nodes.

15. The method of claim 14, wherein forming a lattice structure comprises using an additive manufacturing process.

16. The method of claim 15, wherein the at least one branch of the plurality of branches comprises a non-uniform surface profile on an outer surface.

17. The method of claim 15, wherein the at least one branch of the plurality of branches extends in a curved shape between the adjoining nodes.

* * * * *